United States Patent
Favier et al.

(10) Patent No.: US 7,225,255 B2
(45) Date of Patent: May 29, 2007

(54) METHOD AND SYSTEM FOR CONTROLLING ACCESS TO NETWORK RESOURCES USING RESOURCE GROUPS

(75) Inventors: Valérie Favier, St Martin de l'Uriage (FR); Christophe Guionneau, Grenoble (FR); Frédéric Grardel, St Egreve (FR)

(73) Assignee: Evidian, Les Clayes Sous Bois (FR)

( * ) Notice: Subject to any disclaimer, the term of this patent is extended or adjusted under 35 U.S.C. 154(b) by 458 days.

(21) Appl. No.: 09/740,801

(22) Filed: Dec. 21, 2000

(65) Prior Publication Data

US 2002/0129142 A1    Sep. 12, 2002

(30) Foreign Application Priority Data

Dec. 21, 1999  (FR)  .................... 99 16118

(51) Int. Cl.
*G06F 15/16* (2006.01)
(52) U.S. Cl. .................... 709/225; 726/11
(58) Field of Classification Search ................ 709/225, 709/221; 713/201; 707/221; 726/11–15
See application file for complete search history.

(56) References Cited

U.S. PATENT DOCUMENTS

| 6,182,226 B1 * | 1/2001 | Reid et al. ................. 713/201 |
| 6,212,558 B1 * | 4/2001 | Antur et al. ................ 709/221 |
| 6,880,089 B1 * | 4/2005 | Bommareddy et al. ....... 726/11 |
| 2002/0184525 A1 * | 12/2002 | Cheng ........................ 713/201 |
| 2004/0213258 A1 * | 10/2004 | Ramamoorthy .......... 370/395.1 |

OTHER PUBLICATIONS

Bartal Y, Mayer A et al.: "Firmato: a novel firewall management toolkit" Proceedings of the 1999 IEEE Symposium on Security and Privacy, May 9-12, 1999; pp. 17-31, XP002149049, Oakland, CA Entire Document.

Lodin S W et al: "Firewalls Fend Off Invasions from the Net" IEEE Spectrum, US, IEEE Inc., NY, vol. 35, No. 2; Feb. 1, 1998 pp. 26-34, XP000768657; ISSN: 0018-9235- Entire Document.

Stempel S: "IpAccess-an Internet service access system for firewall installations" Proceedings of the Symposium on Network and Distributed System Security, Feb. 16-17, 1995, pp. 31-41, XP002149391, Los Alamitos, CA USA, Entire Document.

Weber W: "Firewall basics" 4th International Conference on Telecommunications in Modern Satellite, Oct. 13-15, 1999, pp. 300-305, XP 002149051, Nis. Yugoslvaia, Entire Document.

* cited by examiner

*Primary Examiner*—Andrew Caldwell
*Assistant Examiner*—Stephan Willett
(74) *Attorney, Agent, or Firm*—Miles & Stockbridge P.C.; Edward J. Kondracki

(57) ABSTRACT

A method and device for configuring a firewall in a computer system employing a rule for controlling access between a source resource and a destination resource only if said source and destination resources belong to the same protection domain. At a central configuration machine, an access control rule is specified, including a scope, for each resource group, the scope, and thus the access control rule is capable of being interpreted by each of the plurality of firewalls differently depending on the value of the scope and network resource characteristics associated with each of the plurality of firewalls.

15 Claims, 4 Drawing Sheets

METHOD AND SYSTEM FOR CONTROLLING ACCESS TO NETWORK RESOURCES USING RESOURCE GROUPS

FIELD OF THE INVENTION

The present invention concerns the field of firewalls in a computer system, and more specifically the configuration of firewalls.

DESCRIPTION OF RELATED ART

A firewall is a machine or group of machines that makes it possible to protect the junction between an internal network and an external network like the Internet against unauthorized, or even malicious, intrusions. It is noted that the Internet consists of a set of interconnected networks and machines around the world, allowing users throughout the world to share information.

The term "machine" in the present specification represents a very broad conceptual unit that includes hardware and/or software. The machines can be very diverse, such as workstations, servers, routers, specialized machines and gateways between networks.

All of the messages flowing between the internal and external network must pass through the firewall, which examines each message and blocks those that do not comply with given access control rules. The firewall is one element of a global security policy, integrated into an increasingly rich applicative environment and designed to protect computer resources.

Firewalls are used, in particular, to prevent unauthorized Internet users from accessing internal networks connected to the Internet, to give a user of an internal network secure access to the Internet, to separate a company's public machines allowing access to the Internet from its internal network, so as to create a partition in a given network so as to protect the partitioned segments of internal networks.

The firewall is embodied, for example, by a dedicated machine that controls access to the various machines of a given internal network.

To do this, the firewall controls which machines and/or which users and/or which services or applications of an internal network can access which machines and/or which users and/or which services or applications of an external network and vice versa.

Machines belonging to the Internet use the TCP/IP protocol. The firewall filters TCP/IP communications. The firewall manipulates applicative data, information transmitted in the part reserved for data in the headers of TCP/IP datagrams.

The filtering criteria are, to give a non-limiting example:
the calling address,
the address called,
the application called.

The complexity of a firewall configuration is illustrated by the following example, which can be applied to most of the partitioned architectures in enterprise networks.

Let us consider the case of an enterprise network comprising n firewalls named $NW_1, \ldots, NW_n$ connected to subnetworks.

We would like to apply a security policy according to which, in each subnetwork $CC_i$, a workstation (client station) $C_i$ is authorized to access a server $S_i$ located in a subnetwork $SS_i$. The subnetworks $CC_i$ and $SS_i$ are connected to one and the same firewall $NW_i$.

This example can, of course, be extended to include several workstations that are authorized to access several servers.

With conventional firewall configuration systems, administrators work in two ways:

Defining two groups, respectively containing the workstations and the servers. Then defining a rule authorizing the workstation group's access to the server group. This way of working makes it possible to authorize, in a single rule, each station's access to the server connected to the same firewall ($C_i \rightarrow S_i$), but also authorizes the stations' access to all the other servers connected to other firewalls $NW_j$ ($C_i \rightarrow S_j$). This is not the desired security policy.

Defining in each firewall the specific rules authorizing, one by one, each workstation's accesses to the server that corresponds to it. This way of working quickly becomes complicated, even difficult, to put into practice as the number of firewalls, the number of workstations, or the number of servers increases.

Simplifying the configuration is a priority for a firewall administrator.

The current known solutions for attempting to resolve the problem of complexity in the configuration are the following.

There is a known system marketed under the name Net Partitioner and produced by the Solsoft company.

The Net Partitioner device allows the administrator to graphically represent his entire network, with the installation of the firewalls and the various servers and workstations that belong to it. The machines are represented by icons and their interconnections by lines connecting them.

The administrator also defines, in the form of arrows, the ways in which the machines can access other machines and the applications they host.

This solution makes it possible to define groups of computers, as well as rules for controlling access between these groups. On the other hand, the rules define the access of all the elements of a group to all the elements of another group, which complicates the configuration procedure.

The description of the system, (i.e. all of the machines present in the form of icons and their interconnections in the form of lines), and the specification of the rules applied to the system and represented in the form of arrows, are combined in the same graphical interface. The more machines, and the more connections between these machines, the system comprises, the more difficult it is for the administrator to describe the system via the interface.

Moreover, the Net Partitioner device does not provide for any transfer of rules from said device to the firewalls in question, or for any retrieval of the new security policy. The administrator himself must configure each of the firewalls from the results obtained by the Net Partitioner device.

Therefore, this solution does not make it possible to simplify the configuration procedure.

One object of the present invention is to simplify the configuration of a large number of firewalls.

SUMMARY OF THE INVENTION

In this context, the present invention offers a method for configuring a firewall in a computer system comprising objects, the objects for which an access control policy is established being called resources, characterized in that it groups the objects of the system into protection domains, each firewall ensuring the protection of an internal domain relative to an external domain, and applies to the firewall in question a rule for controlling access between a source resource and a destination resource only if said source and destination resources belong to the same protection domain.

The present invention also relates to the system for implementing said method.

BRIEF DESCRIPTION OF THE DRAWINGS

Other characteristics and advantages of the invention will emerge in light of the following description, given as an illustrative and non-limiting example of the present invention, in reference to the attached drawings in which.

DETAILED DESCRIPTION OF THE PREFERRED EMBODIMENT(S)

Figure 1:
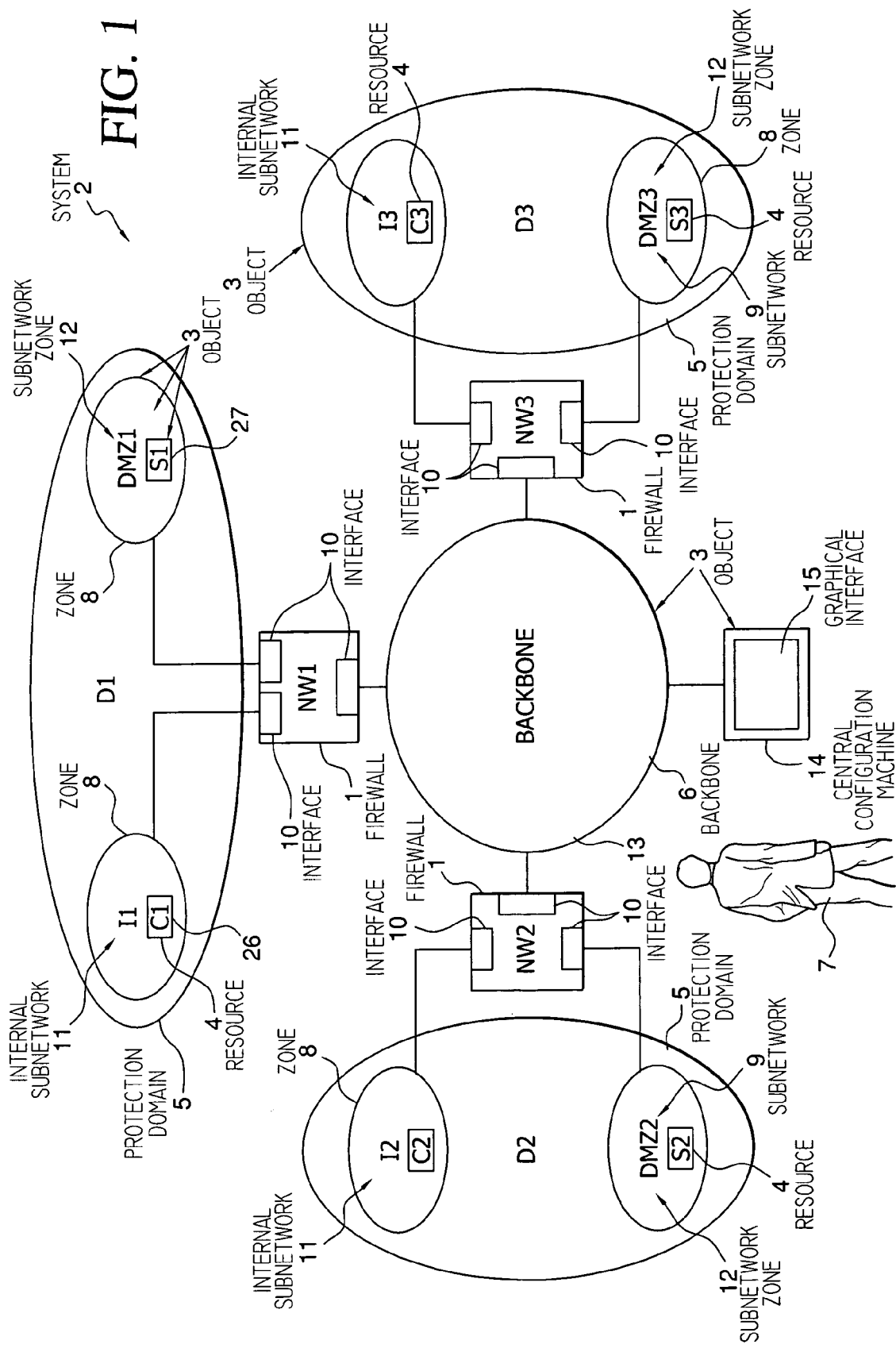
FIG. 1 is a schematic view of the system according to one embodiment of the invention.

As shown in FIGS. 1 through 4, the present invention relates to a method for configuring a firewall 1 in a computer system 2.

The computer system 2 is distributed and comprises objects 3, users and firewalls 1. An object 3 is a very broad conceptual unit that includes hardware and/or software. The objects 3 can be very diverse, such as networks, subnetworks, workstations, servers, routers, specialized machines and gateways between networks, and applications. Only the components of the objects 3 of the system 2 that are characteristic of the present invention will be described, the other components being known to one skilled in the art. The objects 3 between which access control rules constituting the security policy of the system 2 are defined are called resources 4.

As represented in FIG. 1, the firewalls 1 protect an internal domain 5 (D1, D2, D3) relative to an external domain 6 (backbone). An administrator 7 defines for each firewall 1 the internal domain 5 that constitutes the firewall's protection domain. The firewall's protection domain represents what the administrator wishes to protect by means of said firewall relative to what he wants to protect it from, i.e. the external domain.

Each of the two internal 5 and external 6 protection domains is constituted by zones 8 comprising one or more networks or subnetworks 9 of machines. A zone 8 is a part of the system 2 that is separated from the rest of the system by one or more firewalls. The zones 8 are connected to the firewall 1 in question by several network interfaces 10. The administrator 7 determines, for each zone 8 connected to each firewall, whether the zone 8 is inside the protection domain 5 of the firewall (internal zone) or whether it is outside it (external zone), i.e., whether it is directly protected by the firewall or whether it is a zone for providing a connection between the firewalls, or between the various protection domains, which is essentially the same thing.

In the exemplary embodiment illustrated in FIG. 1, each protection domain 5 D1, D2, D3 is controlled by a firewall 1, respectively NW1, NW2, NW3. Each of the firewalls NW1, NW2, NW3 is connected to a zone 8 comprising an internal subnetwork 11, respectively $I_1$, $I_2$, $I_3$, and to a zone 8 comprising a subnetwork 12 of the "demilitarized zone" type, respectively $DMZ_1$, $DMZ_2$, $DMZ_3$. The subnetworks 11 and 12 are inside the protection domain 5.

A subnetwork of the "demilitarized zone" type is a buffer subnetwork, creating a sort of screen between an internal and external network in order to reinforce its protection.

Each firewall 1 is connected to a zone 8 of the external domain 6 comprising a so-called backbone network 13. The zone 8 of the external domain 6 comprising the network 13 is called the backbone zone. The backbone zone 8 constitutes the connection of the internal domain 5 to the rest of the network in question, and represents the outside of the domain 5 in question.

According to one development of the invention, the backbone zone 8 comprises a central configuration machine 14 from which the global configuration of the system 2 is performed. The global configuration of the system 2 can be performed, for example, as explained in the French patent application no. 2,802,662 filed on Dec. 2, 1999 by the present Applicant, the title of which is "METHOD AND DEVICE FOR CENTRALIZED FIREWALL CONFIGURATION IN A COMPUTER SYSTEM", granted 21 Jun. 2001. The central configuration machine 14 offers a graphical interface 15 that allows the administrator 7 to perform said configuration. The graphical interface 15 is illustrated in FIGS. 1 through 4.

The present invention is described below in the embodiment of the system illustrated in FIGS. 1 through 4, which consists in a central configuration of the firewalls. The method according to the invention described for said embodiment can be applied to an isolated firewall without a central configuration.

Figure 2:
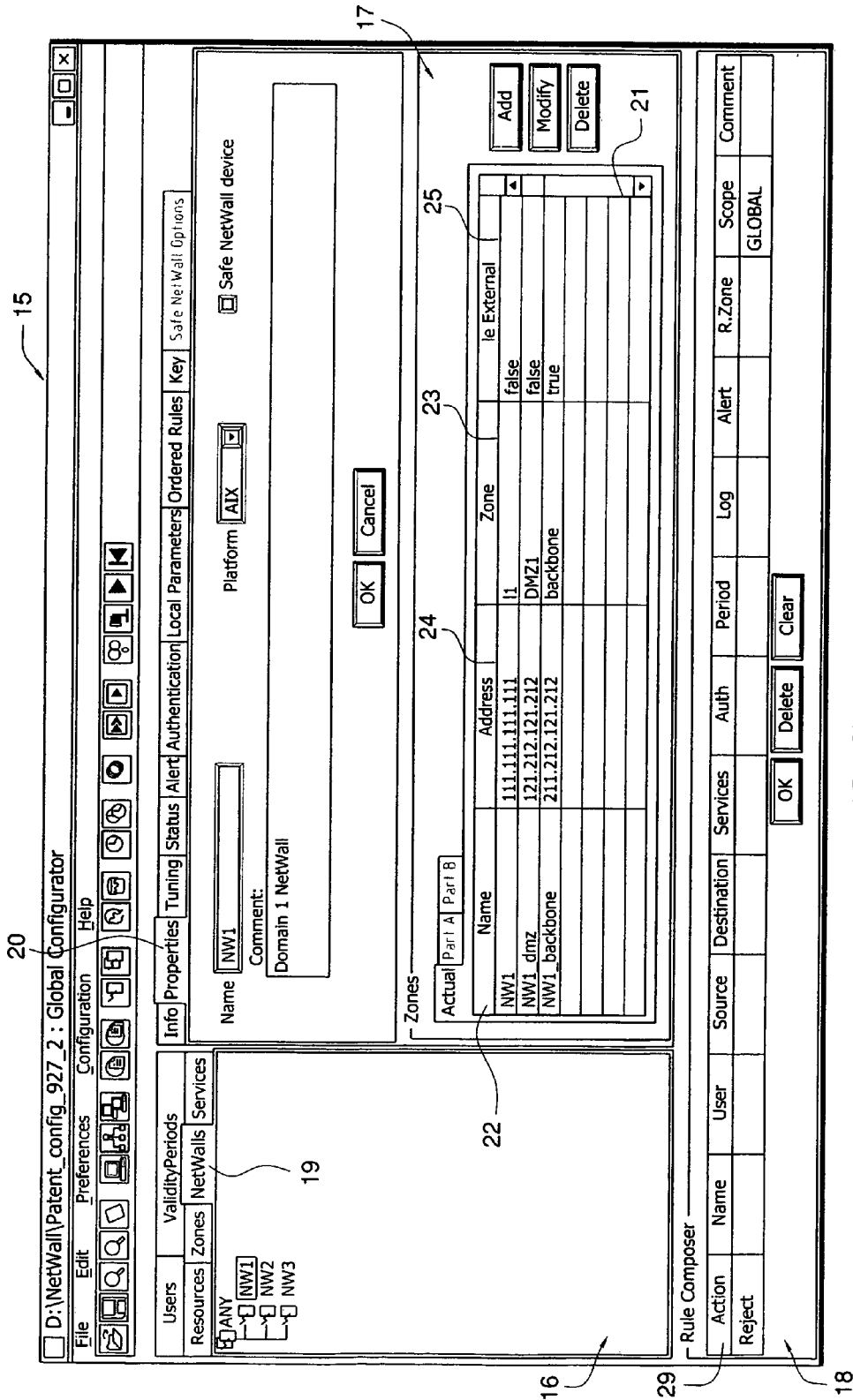
FIG. 2 is a copy of a screen of a graphical interface presenting the firewalls of the system according to FIG. 1 and their properties.

In the embodiment illustrated in FIG. 2, the administrator 7 enters the definitions of the firewalls 1, the domains 5, 6 and the network interfaces 10 through the graphical interface 15. The screen of the interface 15 is divided into three windows: an object window 16 on the left side of the screen of the machine 14, an attribute window 17 on the right side of the screen of the machine 14, and a rule window 18 at the bottom of the screen. In the object window 16, when a "Netwalls" tab 19 is selected, all of the firewalls NW1, NW2, NW3 of the system 2 are indicated. In the attribute window 17, when a "Properties" tab 20 is selected, the properties of the firewall highlighted in the left-hand part (in this case NW1) are indicated in a zone table 21.

The administrator defines the properties of the firewall 1 in the following way. The firewall NW1 has three network interfaces 10, mentioned in the "Name" column 22 with the zones 8 indicated in the "Zone" column 23: a network interface NW1 with the zone of the subnetwork 11, a network interface NW1_dmz with the zone of the subnetwork $DMZ_1$, and a network interface NW1_backbone with the backbone zone. The properties are similar for the firewalls $NW_2$ and $NW_3$. An "Address" column 24 in the table 21 indicates the addresses of the network interfaces whose names are located on the same lines.

An "Is External" column 25 of the zone table 21 makes it possible to specify, for each network interface 10, whether said network interface is attached to a zone 8 outside the protection domain 5 (the value "true") or inside the protection domain (the value "false").

In the example in question, the network interfaces NW1_dmz and NW1 are attached to zones 8 (subnetworks $DMZ_1$, $I_1$) inside the protection domain 5, while the network interface NW1_backbone (backbone network) is outside the protection domain (configuration similar for the firewalls $NW_2$ and $NW_3$).

Each firewall provides access control for both the communications between the domains 5 and the communications between the zones 8 inside the domain 5 for which it is responsible. One part of the security policy concerns access control between the domains; another part of the security policy concerns access control between the zones inside the domain controlled by the firewall.

The invention consists of defining an operation for factoring the access control rules constituting the access control policy so as to minimize the number of filtering rules to be declared by the administrator.

To this end, the administrator 7 joins into the same groups the objects 3 of the system 2 (in the example illustrated, workstations and servers) for which the same security policy is applied. In the example illustrated in FIG. 1, workstations 26 $C_1, C_2, C_3$ are an integral part of the respective internal subnetworks $I_1, I_2, I_3$; servers 27 $S_1, S_2, S_3$ respectively belong to the subnetworks $DMZ_1, DMZ_2, DMZ_3$. The domain D1 groups the zone comprising the internal subnetwork I1 with the workstation C1 and the zone comprising the subnetwork DMZ1 with the server S1. In the example illustrated, only one workstation belongs to the internal subnetwork I1; the subnetwork I1 could contain several workstations C11, C12, C13, ..., C1$k$ and/or any other types of machines. Likewise the subnetwork DMZ1 could contain several servers S11, S12, S13, ..., S1m and/or any other types of machines. The same reasoning is applicable to the other domains and zones.

The administrator 7 can, for example, group the machines $C_1, C_2, C_3$ into a group of workstations 26 and the machines $S_1, S_2, S_3$ into a group of servers 27.

The invention consists of declaring, among the types of groups defined by the administrator, access control rules whose scope is limited to each firewall or extended to the system 2. The administrator specifies for the access control rules whether the scope is local to the firewall or global.

A rule of local scope defines the access relationships between the resources 4 of two groups, said resources belonging to the same protection domain. The local scope makes it possible to limit the rule to accesses inside the protection domain 5.

In the example mentioned above, a rule of local scope defines an access relationship of the group $(C_1, \ldots, C_n)$ to the group $(S_1, \ldots, S_n)$ involving an access from the resource $C_i$ to the resource $S_i$, without establishing a relationship of $C_i$ to $S_j$, with j different from i. When there are several workstations and servers as see above, the principle is the same: the rule of local scope defines an access relationship of the group $(C_{11}, C_{12}, \ldots, C_{1K}, \ldots, C_{n1}, C_{n2} \ldots)$ to the group $(S_{11}, S_{12}, \ldots, S_{1m}, \ldots, S_{n1}, S_{n2} \ldots)$ using an access from the resource $C_{ik}$ to the resource $S_{jm}$, without establishing a relationship of $C_{ik}$ to $S_{jm}$, with j different from i, no matter what k and m are.

A rule of global scope defines the possible access relationships between two groups in the system 2 as a whole.

A rule of global scope is saved and can always be used by the administrator to handle general cases of the security policy. Rules of global scope govern the access relationships of the group $(C_1, \ldots, C_n)$ to the group $(S_1, \ldots, S_n)$ and establish all the relationships of $C_i$ to $S_j$, for i and j varying from 1 to n. When there are several workstations and servers as seen above, the rule of global scope defines an access relationship of the group $(C_{11}, C_{12}, \ldots, C_{1K}, \ldots, C_{n1}, C_{n2} \ldots)$ to the group $(S_{11}, S_{12}, \ldots, S_{1m}, \ldots, S_{n1},$ $S_{n2} \ldots)$ using an access from the resource $C_{ik}$ to the resource $S_{im}$ no mater what i, j and m are.

The "local" or "global" scope attribute of each rule is attached to each rule in such a way that each firewall individually knows the scope of the rules.

Figure 3:
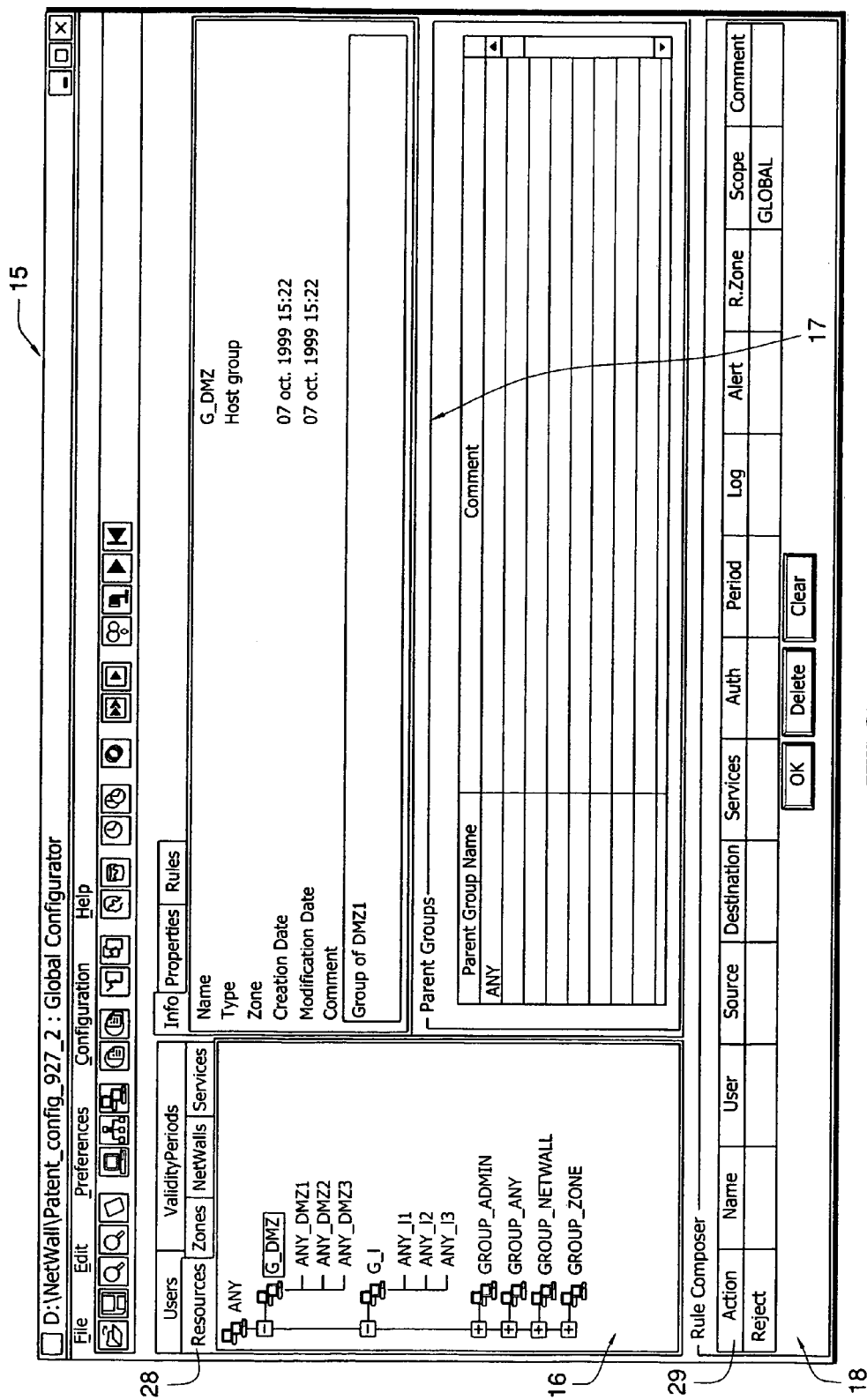
FIG. 3 is a copy of a screen of a graphical interface presenting groups of machines in the system according to FIG. 1.
Figure 4:
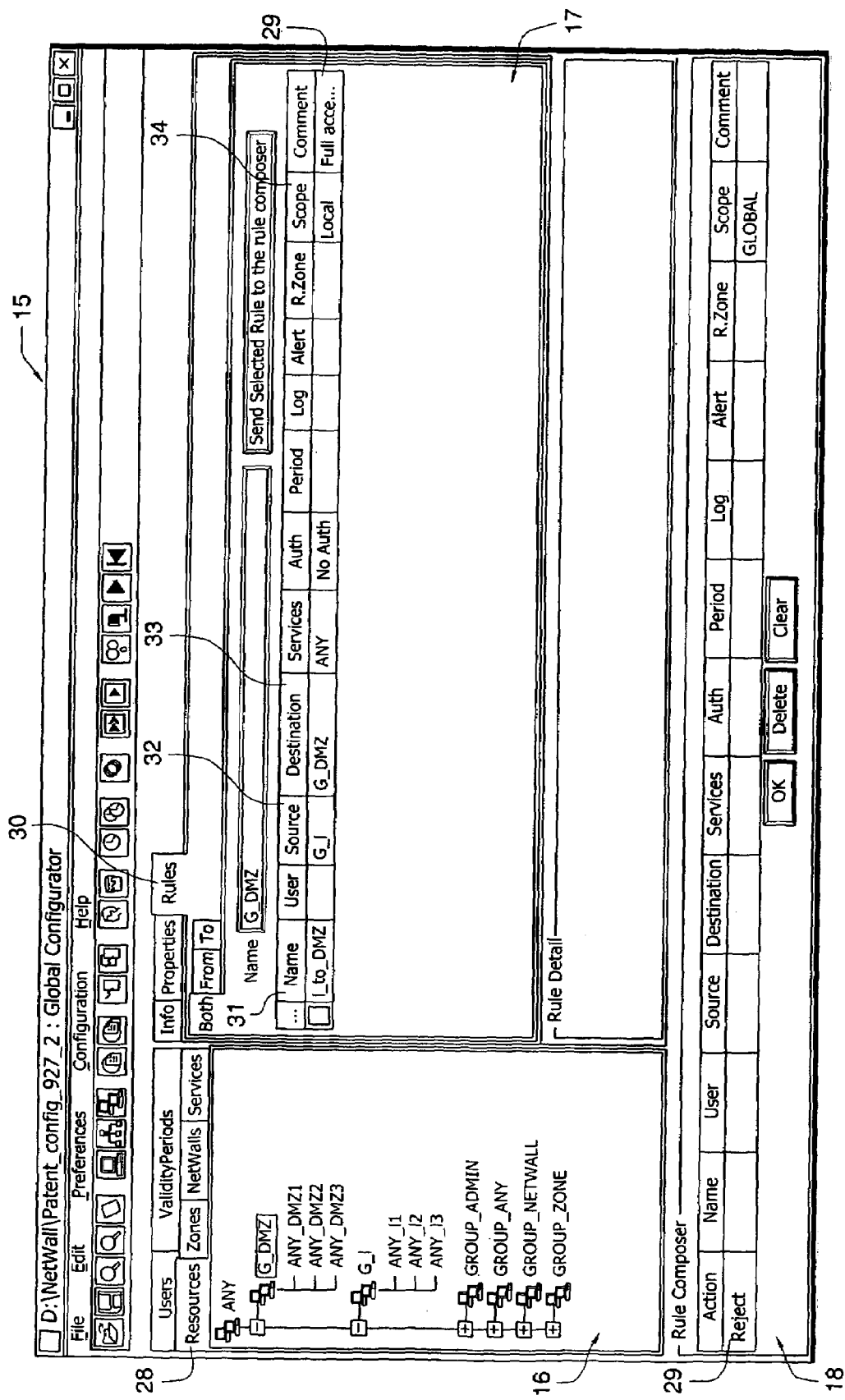
FIG. 4 is a copy of a screen of a graphical interface presenting access control rules in the system according to FIG. 1.

In the embodiment illustrated in FIGS. 3 and 4, the administrator would like to implement an access control policy in which the resources of each internal subnetwork $I_i$ (i in this case varying from 1 to 3) of each protection domain 5 can access the resources of the subnetwork DMZ (i in this case varying from 1 to 3) of the same protection domain 5, without authorizing access between one internal subnetwork $I_i$ of a given domain and the subnetwork $DMZ_j$, with j different from i, of another domain (for example access between the subnetwork $I_1$ and the subnetwork $DMZ_2$).

As shown in FIG. 3, the administrator, using the graphical interface 15, groups the zones of the internal subnetworks $I_1, I_2, I_3$ into the group of internal subnetworks G_I and the zones of the subnetworks $DMZ_1, DMZ_2, DMZ_3$ into the group G_DMZ. In the object window 16, a "Resources" tab 28 having been selected, it is indicated that the group G_DMZ comprises $ANY\_DMZ_1, ANY\_DMZ_2, ANY\_DMZ_3$, i.e. all of the objects of the subnetworks $DMZ_1, DMZ_2, DMZ_3$.

The administrator then defines, in the rule window 18, the rules of local or global scope. In the example illustrated in FIG. 4, a rules table 28 in the rule window 18 that makes it possible to define the rules is displayed in the attribute window 17 when a "Rules" tab 30 is selected. The attribute window 17 shows that the administrator has defined, by means of the table 29 of the window 18, a rule of "local" scope allowing access from the group G_I to the group G_DMZ, the rule thus defined being displayed in the table 29 of the attribute window 17.

The rules table 29 comprises a "Name" column 31 for identifying the access control rule, a "Source" column 32 for designating the source group of the rule, and a "Destination" column 33 for designating the destination group of the rule.

The scope of the rule is defined in a "Scope" column 34 and can have the values "LOCAL" for a local scope or "GLOBAL" for a global scope. In the example illustrated, the scope of the rule has the default value "GLOBAL."

The method according to the present invention works in the following way:

When the firewall applies the access control (for example during an attempt to establish a connection), the firewall 1 analyzes the scope attribute of the rule governing the control of the current access.

If the rule is of global scope, it is applied without any additional control: access is authorized or denied based on the instructions given by the rule. This is a standard firewall operation.

If the scope of the rule is local, the firewall determines the incoming and outgoing network interfaces 10 for the current traffic and analyzes whether these network interfaces are attached to the internal 5 or external 6 domain.

If both the incoming and outgoing network interfaces 10 are attached to the internal domain 5, the current traffic is within the firewall's protection domain 5; the rule is therefore applied and the access is authorized or denied based on the instructions given by said rule.

If one of the two network interfaces 10 is attached to the external domain 6, the current traffic is not within the firewall's protection domain 5; the rule in question is not applicable for the profile of the current traffic.

In the example illustrated, no firewall connecting the domains D1, D2, D3 to one another has been provided. The invention is not concerned with linked domains. The interfaces associated with linked domains are automatically attached to an external domain, which means that the "Is External" column has the true value.

In the example illustrated in FIGS. 2 through 5, the method works in the following way.

During an access from the subnetwork $I_1$ to the subnetwork $DMZ_1$, the firewall $NW_1$ determines that the traffic enters through the network interface 10 $NW_1$ and leaves through the network interface 10 $NW_1\_dmz$. Said network interfaces $NW_1$ and $NW_1\_dmz$ are declared to be inside the protection domain of the firewall in question. The firewall $NW_1$ authorizes the access. The mechanism is similar for accesses from the subnetwork $I_2$ to $DMZ_2$, through $NW_2$, and from $I_3$ to $DMZ_3$ through $NW_3$.

During an access from the subnetwork $I_1$ to the subnetwork $DMZ_2$, the firewall $NW_1$ determines that the traffic enters through the network interface $NW_1$ and leaves through the network interface $NW_1\_backbone$. The first network interface $NW_1$ is declared to be inside the protection domain 5, while the second interface $NW_1\_backbone$ is declared to be outside the protection domain 5. The traffic is not limited to the protection domain 5, and the firewall $NW_1$ does not authorize the access.

In the same way, the firewall $NW_2$ detects that the traffic in question enters through the network interface $NW_2\_backbone$ and leaves through the network interface $NW_2\_dmz$. The network interface $NW_2\_backbone$ is attached to a subnetwork outside the protection domain; the traffic is not limited to the protection domain of the firewall $NW_2$ and is blocked by the latter.

The present invention relates to the method for configuring a firewall 1 in a computer system 2 comprising objects 3, the objects 3 for which an access control policy is established being called resources 4, characterized in that it groups the objects 3 of the system into protection domains 5, 6, each firewall 1 ensuring the protection of an internal domain 5 relative to an external domain 6, and applies to the firewall in question a rule for controlling access between a source resource 4 and a destination resource only if said source and destination resources belong to the same protection domain 5 or 6.

The method determines the protection domain of the resources 4 by means of the network interfaces 10 of the firewall in question, interfaces through which the communications pass in order to reach said resources.

The method defines the zones 8 comprising networks or subnetworks; it associates the network interfaces 10 of the firewalls to which said zones are connected with an internal or external domain; it determines the incoming and outgoing network interfaces 10 of the current traffic; it analyzes whether said network interfaces are attached to an internal or external domain; it applies the rule only if both network interfaces are attached to the same internal domain 5, which corresponds to the fact that the resources belong to the same protection domain.

The method composes the groups of objects 3 for which the access control policy is identical and applies the rule between each of the resources of a source group and a destination group.

The method characterizes the rule with a local or global scope, and it applies the rule to the resources in question only if said resources belong to the same protection domain 5 or 6 when the scope of the rule is local, and applies the rule to all of the resources in question when the scope of the rule is global.

The present invention also concerns the device for implementing the method described above.

The present invention also relates to the device for configuring a firewall 1 in the computer system 2, characterized in that it comprises the central configuration machine 14 that makes it possible to group the objects 3 of the system into protection domains, each firewall 1 ensuring the protection of an internal domain 5 relative to an external domain 6, and to apply to the firewall in question a rule for controlling access between a source resource 4 and a destination resource only if said source and destination resources belong to the same protection domain 5 or 6.

The device comprises the graphical interface 15 from which an administrator 7 can enter the protection domains 5 and 6 and the access control roles.

The graphical interface allows the administrator 7 to define a local or global scope for the access control rule, and the machine 14 applies the rule to the resources in question only if said resources belong to the same protection domain 5 or 6 when the scope of the rule is local, and applies the rule to all of the resources in question when the scope of the rule is global.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for controlling access to network resources, comprising:

at a central configuration machine:

defining an internal protection domain for each of a plurality of firewalls, each internal protection domain including at least one zone, each zone having at least one access-controlled network resource;

defining at least one external protection domain for the plurality of firewalls, the external protection domain including at least one zone having at least one access-controlled network resource, wherein each of the plurality of firewalls protects the internal protection domain relative to the external protection domain and each of the internal and external protection domains comprise one or more of networks and subnetworks of machines;

creating a plurality of resource groups, each resource group including at least one zone;

specifying an access control rule, including a scope, for each resource group, the scope, and thus the access control rule, is capable of being interpreted by each of the plurality of firewalls differently depending on the value of the scope and network resource characteristics associated with each of the plurality of firewalls;

configuring each firewall using the access control rules; and at each firewall:

in response to a request to access a destination network resource received from a source network resource, determining whether to apply the access control rule specified for the resource group associated with the destination network resource based on the scope of the access control rule.

2. A method according to claim 1, further comprising:

determining the protection domain of the access-controlled network resources using firewall network interfaces through which communications pass to reach said access-controlled network resources.

3. A method according to claim 2, further comprising:
associating each firewall network interface with an internal or external protection domain,
determining incoming and outgoing firewall network interfaces of current traffic,
analyzing whether the incoming and outgoing firewall network interfaces are attached to an internal or external protection domain, and
applying the rule for controlling access only if the incoming and outgoing firewall network interfaces are attached to the same internal protection domain and the access-controlled network resources belong to the same protection domain.

4. A method according to claim 3, wherein the rule for controlling access is applied between each of the access-controlled network resources of a source resource group and a destination resource group.

5. A method according to claim 4, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

6. A method according to claim 3, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

7. A method according to claim 2, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

8. A method according to claim 1, wherein the rule for controlling access is applied between each of the access-controlled network resources of a source resource group and a destination resource group.

9. A method according to claim 8, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

10. A method according to claim 2, wherein the rule for controlling access is applied between each of to access-controlled network resources of a source resource group and a destination resource group.

11. A method according to claim 10, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

12. A method according to claim 1, further comprising:
specifying the scope of each rule for controlling access as local or global,
when the scope of the rule is local, applying the rule to the access-controlled network resources in question only if said access-controlled network resources belong to the same internal or external protection domain, and
when the scope of the rule is global, applying the rule to all of the access-controlled network resources in question.

13. A system for controlling access to network resources, comprising:
an external network including at least one external subnetwork having at least one network resource;
a plurality of firewalls, coupled to the external network, each firewall including at least one internal subnetwork, each internal subnetwork having at least one access-controlled network resource; and
a central configuration machine, coupled to the external network, adaptively configured to:
define an internal protection domain for each of the plurality of firewalls, each internal protection domain including a zone corresponding to each internal subnetwork,
define an external protection domain for the plurality of firewalls, the external protection domain including a zone corresponding to each external subnetwork, wherein each of the plurality of firewalls protects the internal protection domain relative to the external protection domain and each of the internal and external protection domains comprise one or more of networks and subnetworks of machines,
create a plurality of resource groups, each resource group including at least one zone,
specify an access control rule, including a scope, for each resource group, the scope, and thus the access control rule, is capable of being interpreted by each of the plurality of firewalls differently depending on the value of the scope and network resource characteristics associated with each of the plurality of firewalls, and
configure each firewall using the access control rules.

14. A device according to claim 13, wherein the central configuration machine includes a graphical interface from which an administrator can enter the protection domains and the access control rules.

15. A device according to claim 14, wherein the graphical interface allows the administrator to define a local or global scope for the access control rule.

* * * * *

UNITED STATES PATENT AND TRADEMARK OFFICE
CERTIFICATE OF CORRECTION

| | | |
|---|---|---|
| PATENT NO. | : 7,225,255 B2 | |
| APPLICATION NO. | : 09/740801 | |
| DATED | : May 29, 2007 | |
| INVENTOR(S) | : Favier et al. | |

It is certified that error appears in the above-identified patent and that said Letters Patent is hereby corrected as shown below:

Column 9, Line 65, replace the word "to" with the word --the--.

Signed and Sealed this

Twenty-first Day of August, 2007

JON W. DUDAS
*Director of the United States Patent and Trademark Office*